United States Patent [19]

Stroble

[11] 3,708,323
[45] Jan. 2, 1973

[54] COUPLET TRANSPARENCY MANUFACTURING PROCESS

[75] Inventor: Howard G. Stroble, Dayton, Ohio 45409

[73] Assignee: The National Cash Register Co., Dayton, Ohio

[22] Filed: Dec. 28, 1970

[21] Appl. No.: 101,664

[52] U.S. Cl. ............................ 117/36.7, 117/155 VA
[51] Int. Cl. .................................................. B41m 5/16
[58] Field of Search ........................... 117/36.7, 36.1

[56] References Cited

UNITED STATES PATENTS

| 3,138,515 | 6/1964 | Dritz | 117/36.1 |
| 3,298,895 | 1/1967 | Plambeck | 117/36.7 |
| 3,014,301 | 12/1961 | Grupe | 117/36.7 |

Primary Examiner—Murray Katz
Attorney—E. Frank McKinney and Robert J. Shafer

[57] ABSTRACT

A couplet transparency data display manufacturing system is disclosed wherein, of two sheets, an oversheet is a flexible carrier for solvent and the undersheet is a transparent polymeric material readily dissolved by the solvent of the carrier. Preferred for the oversheet is paper or a paper substitute capable of accepting printed information.

4 Claims, 2 Drawing Figures

3,708,323

OVERSHEET CONTAINING CAPSULES OF SOLVENT FOR THE POLYMERIC MATERIAL.

TRANSPARENCY SHEET OF POLYMERIC MATERIAL.

INVENTOR
HOWARD G. STROBLE

COUPLET TRANSPARENCY MANUFACTURING PROCESS

BACKGROUND OF THE INVENTION

The present invention relates to a couplet form of two sheets for manufacturing transparencies exhibiting data or intelligence to be conveyed or displayed by projection onto a remote screen and for manufacturing a printed master sheet record of the data or intelligence. The invention also pertains to a method for manufacturing such a couplet. The invention further pertains to the transparency resulting from use of the couplet and it particularly relates to the manufacture of such a transparency by rupture of solvent-containing capsules included within the confines of one of the couplet sheets. The present invention also pertains to a couplet transparency system and method for its use wherein a master sheet of data and a transparency sheet of the same data are provided simultaneously in the same operation.

1. Field of the Invention

For several years there has been need for an efficient and inexpensive display product useful in projection systems wherein the product is a light-transmitting, data-containing, sheet or chip. Transparency films used for projection have been made by several methods, all of which have proven relatively expensive or inefficient or both. Moreover, the materials and process of manufacture have proven to be cumbersome and expensive. It is an object of the present invention to provide a system for producing transparencies eligible for use in remote screen projection equipment. It is a further object to provide such a system which is both relatively inexpensive and efficient. It is a further object of the present invention to provide transparencies produced by the use of the system along with an original or master sheet, simultaneously, in the same operation. A further object of the present invention is to provide such a transparency having a high degree of resolution and contrast.

2. Description of the Prior Art

At the present time, transparencies find use in several different but related areas which pertain to light image projection of some type. The products of the prior art have included very sophisticated and, concomitantly, expensive transparencies produced by photographic means.

The prior art also includes, for example, a two-piece, pigment transfer, transparency manufacturing system wherein data provided on a previously prepared master sheet is transferred, using heat release by infrared absorption, to a transparent oversheet. The pigment material is such as can be melted by said infrared absorption and thereby, transferred, in the melt form, by contact with the transparent sheet. In the above-noted system, data is provided on the master by a multitude of minute and meltable particles which include a pigment of coloration as one component. There is a tendency for such melted particles to serve as an adhesive in operation of this system, thus resulting in difficult separation of the master sheet and the transparency sheet.

The prior art also provides a transparent sheet comprising solid solution of at least two polymers which, when warmed above the melting point of one of the polymers or when contacted with particular solvents, undergo temporary non-reversing phase separation at the point of heat or solvent contact. Such a system is disclosed in U.S. Pat. application Ser. No. 836,021, filed June 24, 1969 in the name of A. M. Purcell et al. and assigned to the assignee herein. That system of solid solution of polymeric materials, while being efficient and capable of resolution to a microscopic degree, is also relatively expensive and therefore of questionable utility as a high volume, low cost, one-use, item.

The prior art also includes a transparency producing system wherein the transparency sheet is coated with a heat-colorable dye and the sheet is used in thermocopying apparatus in conjunction with a previously prepared master sheet having heat-absorbing data. The data absorbs heat, warms the transparency in corresponding locations and causes coloration of the dye.

U.S. Pat. No. 3,424,640 issued Jan. 28, 1969 on the application of W. Hines et al. discloses a method for producing opaque patterns on initially transparent films of polymeric material. The process requires a series of steps, however, including a film-swelling step and a film-fixing step. The present invention requires only a single step to produce a completed transparency sheet.

SUMMARY OF THE INVENTION

For several years, transparencies have been used as a means for providing visual aids in education, sales promotion and other appropriate areas. As above-noted, the transparencies have characteristically been relatively expensive if well-made. Requirements of the art have surpassed the use of grease pencil marks on a glass plate and the industry in general desires—requires—neatly made and artistically presented transparency products at a reasonable price.

Photography has been utilized for microreproduction and for other, rather small-format, transparency manufacture. Photographic reproduction, however, is expensive; and, in the overall view, inefficient for preparation of transparencies for the reason that scenes must be staged before photographing and then the photographs must be developed and printed or finished prior to their use in projectors. The recent in-the-camera-developing films which can provide useful transparencies have been found to be prohibitively expensive, although they may find use in limited areas.

In the field of projection equipment, the general arrangement of components is similar from one device to another. A transparency is lighted from one side providing an image through the other side which image is modified and focused by a lens system to be projected either on a screen remote from the system or on a screen contained within the equipment itself. The product of the present invention is most particularly adapted for use in equipment known as "overhead projectors". Such projectors utilize relatively large-sized transparency sheets and project to a remote screen with a relatively small degree of magnification. The product of the present invention is also useful in so-called "rear screen projectors" wherein the focused image is projected onto the back side of a frosted, translucent, screen and the projection is read from the front side of the screen. In general, the product of this invention is eligible for any use requiring a transparency data display for projection.

The present invention comprises a couplet of sheets wherein there is an oversheet which includes capsules containing a liquid solvent and wherein there is an undersheet of transparent polymeric material dissolved by the solvent of the capsules. That couplet, when subjected to the energy of striking force or other pressure, produces a mark on the undersheet which is nearly opaque and suitable to exhibit the conformation of the applied energy. In the application of energy, the surface of the undersheet is disrupted and capsules in the oversheet are ruptured releasing solvent which dissolves a minute portion of the transparent undersheet at the area of the disruption. Surprisingly, that dissolved area of disruption appears to take the form of crazed or cracked discontinuities in the sheet's surface, thus providing an interference of light transmitted through the sheet. Although complete understanding of operation of the invention is not necessary, it is presently believed that an application of the combination of a relatively high pressure and a relatively small amount of solvent to a body or film sheet of the transparent material serves to yield a mark of crazed discontinuities as above-described. The solvent must be a solvent for the transparent material and must be supplied in an amount approximately commensurate with that of capsules on or in a flexible oversheet of the couplet. The unexpected aspects of the discovery that opacified areas are created on transparent polymeric material by application of the combination of force and solvent, will be more thoroughly discussed hereinbelow.

The oversheet—that sheet containing the capsules—while it may be any flexible sheet-like material, is preferably of a material capable of absorbing released solvent so that, on capsule rupture, any excess solvent will not "puddle" on the transparency surface and thereby cause ragged or imperfect definition of individual data images. In present practice of the invention the most preferred material for use in the oversheet is fibers of the kind customarily provided in paper and capable of being printed or written upon.

The undersheet, that is, the film of transparent polymeric material, may be any of a multitude of polymeric films either commercially available or not. The single requirement for the polymeric material of the transparent sheet is that it must be soluble in such a way to leave residual "crazes" by application of an appropriate solvent contained in the capsules of the oversheet and capsule-rupturing forces applied to the sheet. Moreover, the transparent film can comprise more than one or, in fact, several of such polymeric materials combined. Polymeric materials eligible for use in the present invention include: polystyrene, polyvinylacetate, polyvinylchloride, polyalkylmethacrylates such as polymethylmethacrylates and polybutylmethacrylates, cellulosics such as ethyl cellulose and nitrocellulose, cellulose esters such as cellulose triacetate and cellulose acetate butyrate and cellulose acetate and propionate, polycarbonates, copolymeric materials of the above, and the like. Although eligible polymeric materials may be soluble in water, the preferred materials are hydrophobic and soluble in relatively volatile organic solvents.

Solvents for use in the invention are relatively volatile, generally hydrocarbon-based, non-plasticizing liquids. The only essential criterion in selection of the solvent is that the solvent must dissolve the polymeric material of the transparency undersheet. Effect of the solvent, however, is also measured by its volatility. Although not of essential importance to the operation of the invention, the quality of a mark appears to be enhanced using a highly volatile solvent. Also, it is preferred that the solvent have little or no plasticizing characteristics in relation to the undersheet because plasticization tends to induce healing of the "crazes". Representative of solvents eligible for use in the present invention are: tetrachloroethylene, toluene, xylene, carbontetrachloride, ethylmethylketone, acetone, benzene, chloro- and nitrobenzene, cyclohexane, hexyl acetate, chloroform, dioxane, methyl chloroform and the like.

An important and unexpected feature of the present invention resides in the discovery that, while not all transparent polymeric film materials will yield marks on simple contact with a solvent for the material, a mark results when solvents are provided in small amount and accompanied by adequate pressure. As will be demonstrated in examples below, some polymeric film materials in some forms are dissolved but not marked by bulk contact with solvents while those same solvents, when supplied in capsules and applied by capsule rupture in contact with the films, make very effective marks. Furthermore, even in transparent films which are marked by bulk solvent contact, the films are more effectively marked by capsule rupture as described in the present invention. That is, marks produced by capsule rupture are more opaque than those effected by bulk solvent contact. The reasons for such marking differences between solvent supplied in bulk and solvent supplied in capsule rupture are not well-understood. Supplying solvent by capsules contained on or in an oversheet of the herein-described couplet wherein the undersheet is a transparent sheet of polymeric material dissolved by the solvent, is what is considered to be the hub of the present invention. The discovery that supplying solvent in capsules permits making marks on polymeric materials dissolved by the solvent when bulk supply of the solvent does not always make marks, is considered to represent a substantial advance in the art of manufacturing transparencies. Although the solvent is selected with a view toward providing an optimum in marking ability and mark quality by its combination with a particular transparent sheet, some solvent materials are more easily and perfectly contained within the confines of presently known capsule wall materials. Some particular solvents are preferred over others at the present time, for the reason that they can be contained for a longer time with less permeation and loss of material through the capsule walls.

Capsules for use in containing solvents of the present invention can be of any size ranging from less than about one micron to greater than several hundred microns. It is well-taught in the prior art that capsules of nearly any size can be successfully manufactured. Capsule size in the present invention is a determinative factor only with regard to the degree of resolution and definition of images on the transparency sheet. For example, large capsules will provide images which appear to have blurred or ragged edges when viewed under moderate magnification. Smaller capsules provide images with increased edge definition. Preferred capsule sizes are about 2 to 100 microns; most preferred being 5 to 20 microns. The capsules can be manufactured according to any of several processes taught in the prior art. Preferred for use in the present invention are processes such as those described by U.S. Pat. No. 2,800,457 and No. 2,800,458 issued July 23, 1957 on the application of B. K. Green et al. and B. K. Green, respectively. Also included amongst eligible encapsulation processes are those of U.S. Pat. No. 3,041,289 issued June 26, 1962 on the application of Katchen et al. and U.S. Pat. No. 3,341,466 issued Sept. 12, 1967 on the application of Brynko et al. Of course, capsules can be manufactured by other mechanical or chemical processes; the only requirements being that the capsule walls exhibit adequate impermeability to diffusion of contents and that the capsules be of a size commensurate with the desired or required image resolution and definition. The capsules can contain from about 50 percent, by weight, to more than about 95 percent, by weight, solvent; about 70 to 90 percent being preferred. The capsules can be coated on or included within the oversheet by any of several means well-known and described in the prior art. It is preferred that the capsules be coated as a layer on the side of the oversheet which is in contact with the undersheet when the couplet is assembled.

If desired or required for some particular use or application, it is to be understood that additional components can be utilized in combination with the elements of the presently described couplet invention. As an example, if desired, a dye or other indicating material can be supplied in solution or dispersion with the encapsulated solvent. Also, the transparent sheet can be colored or not and initially provided with a flexible but removable substrate or not, as desired. In the case of a substrate support for the transparent film, the film, of course, must be separated from the substrate before use of the film as a transparency. Heat sufficient to burst the capsules can be provided by a focused light energy source or by warmed type font. Static pressure must only be provided to a degree adequate to rupture sufficient capsules to afford the desired mark. Of course, striking forces or dynamic pressure forces such as provided by a stylus or the striking key of a typewriter are the energy forces anticipated to be those usually used in practice of the present invention.

Of particular benefit in the present invention, is the provision for manufacturing a master copy of primary written or typed information and a transparency exhibiting that same information, both in a single step. If it is not desired or required that a master copy be manufactured, the couplet can be utilized by providing energy directly to the transparency (undersheet) side of the couplet rather than by writing or typing on the oversheet. The only requirement is that the applied energy be adequate to rupture the capsules of the oversheet.

BRIEF DESCRIPTION OF THE DRAWING

In FIG. 1, the oversheet representation is intended to include the instance of a coating of capsules on its underside and the instance of capsules mixed throughout the sheet, such as capsules in substantial homogeneity with fibers of a paper sheet. The capsules can be provided over the entire surface of the oversheet or in only specifically selected areas. The transparency sheet of polymeric material of FIG. 1 is any of the eligible polymeric materials either initially supported by a backing sheet or not and may be already mounted by being included within the bounds of a stiff, framing, material or not, as desired. Pressure can be applied to the couplet using a pencil, pen or type font or, if a primary mark is not desired on the oversheet to yield a master copy, a non-marking stylus can be used.

Figure 1:
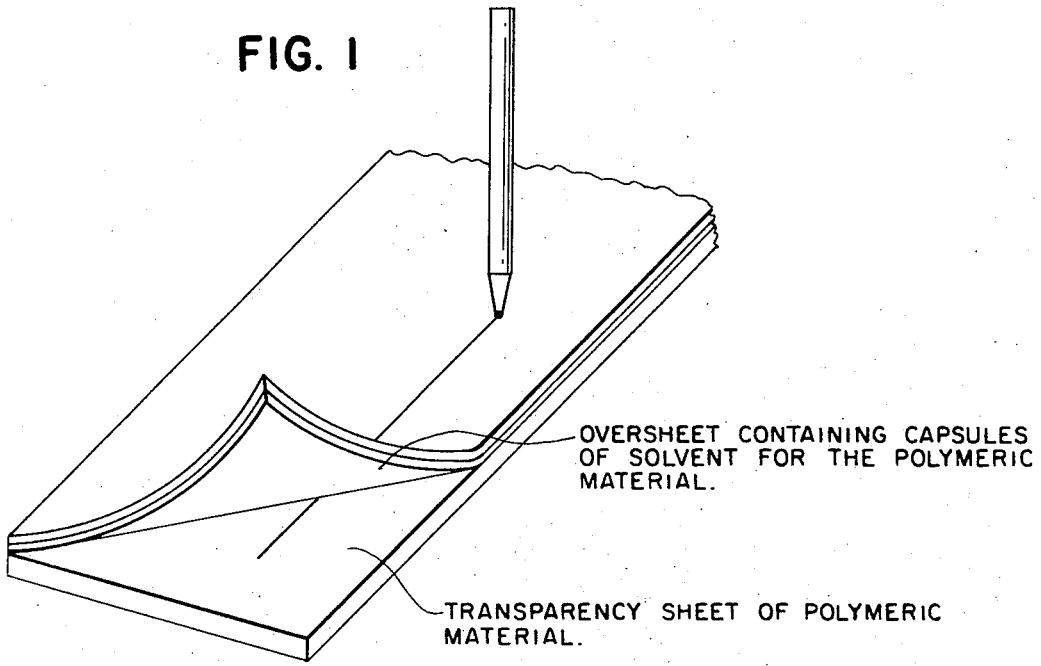
FIG. 1 is a schematic representation of the couplet of the present invention also showing a mark made by stylus pressure.
Figure 2:
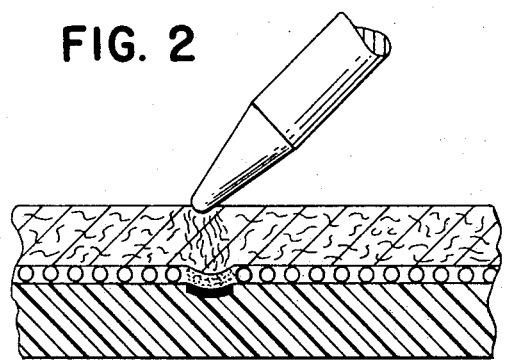
FIG. 2 is a cross-sectional schematic representation of the couplet of FIG. 1 demonstrating, in detail, a transfer of pressure through an oversheet to rupture capsules and provide solvent to the face of a transparent undersheet.

In the cross-sectional depiction of FIG. 2, capsules are particularly shown to be coated on the bottom surface of the oversheet. Such is the preferred embodiment of the present invention, but not required. As is shown on the surface of the transparent undersheet of FIG. 2, solvent released from ruptured capsules does not materially affect the transparent sheet throughout its thickness; the solvent apparently taking effect only a disruption of the surface through a thickness of an upper portion of the sheet, more or less.

DESCRIPTION OF PREFERRED EMBODIMENTS

Example 1

This example serves as general description of the couplet of the present invention; it being understood that any of a multitude of polymeric materials and solvents can be used in combination to assemble the couplet system. The oversheet in this example is paper and the undersurface of the paper has been coated with a layer of minute capsules containing tetrachloroethylene as a solvent. The capsules are about 10 to 20 microns in average diameter, contain about 90 to 95 percent, by weight, tetrachloroethylene and are made according to the process disclosed in U.S. Pat. No. 3,041,289 referred to above. The capsule coating of this example was approximately 4.8 pounds per ream. Capsule coatings for use in the couplet could range in weight from about 2 to about 10 pounds per ream (a ream is considered to be 500 sheets, 25 × 38 inches in size, coated on one side). The upper limit is primarily a matter for economic consideration although an excess of solvent material released to the transparent undersheet should be guarded against. The capsules in this example have walls which include a combination of gelatin and a copolymer of polyvinylmethylether and maleic anhydride. The undersheet of the present example is an extruded polystyrene film having a thickness of about 3 mils, such as that sold under the trademark "Tricite" by the Dow Chemical Company, Midland, Michigan, United States of America, and characterized by exhibiting a viscosity of 23–30 centipoises at 25° centigrade as a 10 percent, by weight, solution in toluene and a Vicat softening point of 107° centigrade. Vicat softening point is defined as the temperature at which a particular needle penetrates a body of the material under a specified load. Particulars for determination of the Vicat softening point are set out as Method D-1525-65T by the American Society For Testing And Materials.

In practice of the invention, the capsule-coated paper sheet is superimposed on the transparent undersheet—for convenience and to maintain alignment of data, at least one edge of the sheets are joined—and data desired to be exhibited on the transparent sheet is written onto the oversheet. When pressure is applied, such as by typewriting on the couplet, a permanent typewritten record is made on the oversheet, capsules are ruptured to supply solvent to dissolve a surface portion of the undersheet and a transparency eminently suited for use in overhead projectors results.

Example 2

The transparent polymeric film material used in this example was poly(methylmethacrylate-co-n-butylmethacrylate) such as the material sold under the trademark "Elvacite 2013" [1]("Elvacite 2013" is a poly(methylmethacrylate-co-n-butylmethacrylate) material characterized by an inherent viscosity of 0.20° at 20° centigrade in a solution containing 0.25 grams of the polymer in 50 milliliters of chloroform. Inherent viscosity is defined as the natural logarithm of the relative viscosity of the material divided by the concentration of the polymer in grams per 100 milliliters of the specified solvent where the relative viscosity is the viscosity flow-time ratio of the polymer solution to the solvent under identical conditions using the same visometer.) by E. I. du Pont de Nemours & Co., Inc., Wilmington, Delaware, United States of America. Poly(methylmethacrylate-co-n-butylmethacrylate) is a very flexible film when cast from solution and was selected for use in this example to test the effect of that characteristic of flexibility.

A film of the acrylate polymer material was cast onto a glass plate from a 40 percent, by weight, solution in toluene. The film was dried overnight at about 20° centigrade and was tested using several solvents, as described below.

As a first test, the transparent film was swabbed using cotton balls soaked in several solvents for the film material. Of tests with ten solvents, seven resulted in no mark and three resulted in a mark only somewhat distinguishable from the transparent portion of the sheet. The solvents which left no distinguishable mark were xylene, acetone, benzene, butyl Cellosolve (Trademark), toluene, hexyl acetate and dioxane. The solvents which left some mark were tetrachloroethylene, chloroform and nitrobenzene.

As a second test, the transparent film was overlayed by capsule-coated sheets on which capsule-rupturing marks were made using a stylus. The second test constitutes manufacture of a couplet and practice of the invention. The pressure of the stylus served to rupture capsules releasing solvent for contact with the surface of the film. Individual oversheets having capsules containing toluene, xylene, hexyl acetate and tetrachloroethylene were used, and all yielded marks of a high degree of opacity.

It is noted that, although toluene, xylene, and hexyl acetate resulted in no mark in the swabbing tests, each of those solvents yielded marks when the solvent was provided from the rupture of capsules coated onto an oversheet. Moreover, the encapsulated tetrachloroethylene provided marks of substantially greater opacity than tetrachloroethylene applied by swab.

Example 3

In this example, ethyl cellulose was cast from a 10 percent, by weight, solution in toluene. The ethyl cellulose used herein was designated as "N-22" (Trademark) by Hercules, Incorporated, Wilmington, Delaware, United States of America and was characterized by being 48.4 percent ethoxylated and exhibiting a viscosity of 20 centipoises in a 5 percent, by weight, solution in an 80/20, by weight solvent of toluene and ethanol. In preliminary tests, as were conducted using cotton swabs in Example 2 above, none of toluene, hexyl acetate or tetrachloroethylene left acceptable marks.

The ethyl cellulose film was then assembled into a couplet by application of individual oversheets including solvent-containing capsules of various kinds. Each of the oversheets, when subjected to capsule rupturing forces, yielded solvent in contact with the ethyl cellulose film and produced an opacified mark on said film. The oversheets which were used having capsules containing toluene, hexyl acetate and tetrachloroethylene—the same solvents which did not yield marks in swab application—yielded highly opacified data marks in conformance with the applied pressure.

Example 4

The polymeric film material of this example was polymethylmethacrylate sold as "Lucite" (Trademark) by E. I. du Pont de Nemours & Co., Inc., Wilmington, Delaware, United States of America. The polymethylmethacrylate film was tested using the same solvents as were used in Example 3 above. Swab application yielded no marks using any of the solvents. The methacrylate film was then made into couplets using the oversheets of solvent-containing capsules from Example 3; and all of the couplets yielded opacified marks of good quality on the transparency sheet after capsule rupture.

Example 5

The polystyrene sheet of Example 1 is marked in an identical manner using individual oversheets including capsules which contain the following solvents: toluene, xylene, chloroform, methyl chloroform, acetone, ethylmethylketone, dioxane, nitrobenzene, benzene and hexyl acetate. In the case of this polystyrene sheet, however, the above solvents were found to mark by swab application although the marks so made were not of highly opacified character.

A film of another polystyrene material was cast onto a glass plate from a 50 percent, by weight, solution in benzene. The film was dried overnight at about 20° centigrade and was tested as described in previous examples. The polystyrene used was identified as "Styron 678" (Trademark) sold by Dow Chemical Company, Midland, Michigan, United States of America, and characterized by having a Vicat softening point (defined in Example 1, above) of about 90° centigrade. The polystyrene film was not marked by swab application of any of toluene, hexyl acetate or tetrachloroethylene but was marked by all of those solvents when applied from ruptured capsules as the couplet of this invention.

What is claimed is:

1. A process for manufacturing a transparency data display using a couplet of sheets which couplet includes a flexible, absorbent, oversheet including minute, pressure-rupturable, solvent-containing capsules and a transparent undersheet of polymeric material soluble in the solvent of the capsules, comprising:
   a. applying capsule-rupturing forces to the oversheet to,
      i. force the capsules of the oversheet into close contact with the undersheet,
      ii. cause stresses in the surface of the undersheet, and
      iii. rupture the capsules to release solvent to the stressed undersheet surfaces whereby, at points of solvent release onto the undersheet surfaces, the transparent undersheet is rendered opaque and
   b. separating the sheets to yield a transparency sheet having opacified areas delineating data images to be displayed.

2. The process of claim 1 wherein the oversheet is paper and wherein the capsules of the oversheet are substantially homogeneously distributed throughout the sheet.

3. The process of claim 1 wherein the capsules of the oversheet are present as a coated layer in contact with a surface of the undersheet.

4. The process of claim 1 wherein the transparent undersheet is releasably supported by a stiffening substrate.

* * * * *